United States Patent
Hsu

(10) Patent No.: US 11,390,114 B2
(45) Date of Patent: Jul. 19, 2022

(54) BICYCLE DISC WHEEL

(71) Applicants: Joseph Hsu, Zhongshan (CN); ZHONGSHAN FUDA SPORTS APP CO., LTD., Zhongshan (CN)

(72) Inventor: Joseph Hsu, Taichung (TW)

(73) Assignees: Joseph Hsu, Zhongshan (JP); ZHONGSHAN FUDA SPORTS APP CO., LTD., Zhongshan (JP)

( * ) Notice: Subject to any disclaimer, the term of this patent is extended or adjusted under 35 U.S.C. 154(b) by 266 days.

(21) Appl. No.: 16/727,403

(22) Filed: Dec. 26, 2019

(65) Prior Publication Data

US 2021/0170786 A1 Jun. 10, 2021

(30) Foreign Application Priority Data

Dec. 10, 2019 (CN) .......................... 201922202234.5

(51) Int. Cl.
| | |
|---|---|
| *B60B 5/02* | (2006.01) |
| *B60B 1/06* | (2006.01) |
| *B60B 3/08* | (2006.01) |
| *B60B 1/00* | (2006.01) |
| *B60B 1/04* | (2006.01) |

(52) U.S. Cl.
CPC ................ *B60B 5/02* (2013.01); *B60B 1/003* (2013.01); *B60B 1/06* (2013.01); *B60B 3/085* (2013.01); *B60B 1/041* (2013.01)

(58) Field of Classification Search
CPC ........... B60B 5/02; B60B 1/003; B60B 1/041; B60B 3/001; B60B 2900/1216; B60B 3/085; B60B 3/082; B60B 1/06; B60B 1/14
See application file for complete search history.

(56) References Cited

U.S. PATENT DOCUMENTS

| | | | | |
|---|---|---|---|---|
| 3,709,561 A | * | 1/1973 | De Biasse | ............... B62L 3/023 301/6.9 |
| 4,919,490 A | * | 4/1990 | Hopkins | .................. B60B 5/02 301/110.5 |
| 4,995,675 A | * | 2/1991 | Tsai | .......................... B60B 5/02 301/95.104 |
| 5,080,444 A | * | 1/1992 | Hopkins | ................. B60B 1/003 301/95.102 |

\* cited by examiner

*Primary Examiner* — Kip T Kotter
(74) *Attorney, Agent, or Firm* — Muncy, Geissler, Olds & Lowe, P.C.

(57) ABSTRACT

A bicycle disc wheel includes two discs respectively formed of two composite material layers with a foam material bonded between the two composite material layers, a wheel frame arranged between the two discs in a concentric manner; and a spoke frame composed of a plurality of I-shaped ribs and sandwiched between the two discs. Each I-shaped rib is composed of a foam material and a composite material cladded on the foam material. Each I-shaped rib has a relatively wider opposite upper and lower sides and a relatively narrower middle section when it is viewed from the cross section, and the relatively wider opposite upper and lower sides of each I-shaped rib are respectively attached to the respective inner side of the two discs.

8 Claims, 6 Drawing Sheets

US 11,390,114 B2

BICYCLE DISC WHEEL

BACKGROUND OF THE INVENTION

1. Field of the Invention

The present invention relates to bicycle tire structure technology, and more particularly to a bicycle disc wheel.

2. Description of the Related Art

Generally common bicycle disc wheels are made of two discs with a wheel frame sandwiched there between. In the center of the two discs, there will be a through hole to install a hub. Therefore, only the thin structure of the two discs is used to convey power between the wheel frame and the hub. It is easy to produce insufficient power transmission or to cause disc wheel twisting and deforming, especially when the rider stands up and presses the pedal to accelerate. Therefore, there is a need for a disc wheel structure that is stronger in structure but does not significantly increase the weight.

SUMMARY OF THE INVENTION

The present invention has been accomplished under the circumstances in view. It is the main object of the present invention to provide a bicycle disc wheel, which has good structural strength and light weight.

To achieve this and other objects of the present invention, a bicycle disc wheel comprises two discs, a wheel frame and a spoke frame. The two discs are circular, each having a through hole provided in the center. The wheel frame is arranged between the two discs in a concentric manner. The spoke frame is composed of a plurality of I-shaped ribs and sandwiched between the two discs. Each of the I-shaped ribs is composed of a foam material and a composite material cladded on the foam material. Each I-shaped rib has relatively wider opposite upper and lower sides and a relatively narrower middle section when viewed from the cross section. The relatively wider opposite upper and lower sides are respectively attached to a respective inner side of the two discs. Each I-shaped rib has an outer end and an opposing inner end when viewed in the longitudinal direction thereof. The outer end of each I-shaped rib is affixed to the wheel frame. Furthermore, each I-shaped rib is provided with an outer expansion portion on both sides of the outer end for connection with the wheel frame, so that the outer diameter of the outer end of each I-shaped rib is increased and curved to connect the arc of the wheel frame, enhancing the connection strength between the I-shaped ribs and the wheel frame.

DETAILED DESCRIPTION OF THE INVENTION

It must first be explained that the technical features provided by the present invention are not limited to the specific structures, uses, and applications described in the preferred embodiment. The terms used in the present specification are all illustrative description terms understood by those with ordinary knowledge in the technical field. Directional adjectives such as "front", "up", "down", "back", "left", "right", "top", "bottom", "inside", and "outside" mentioned in the contents of this specification are merely illustrative descriptions based on normal directions of use, and are not intended to limit the scope of claims.

Furthermore, the singular forms of "a", "one", and "the" as used in the claims of the present invention include the meaning of plural. Thus, for example, a description of "an element" refers to one or more elements and includes equivalent substitutions known to those of ordinary skill in the art. All connectives used in similar situations should also be understood in the broadest sense. The specific shapes and structural features or technical terms described in the specification should also be understood as including equivalent structural or technical uses of functions that can be achieved by specific structural or technical terms.

Referring to FIGS. 1-7, a bicycle disc wheel in accordance with the present invention is shown. The bicycle disc wheel comprises two discs 10, a wheel frame 20, and a spoke frame 30.

Figure 5:
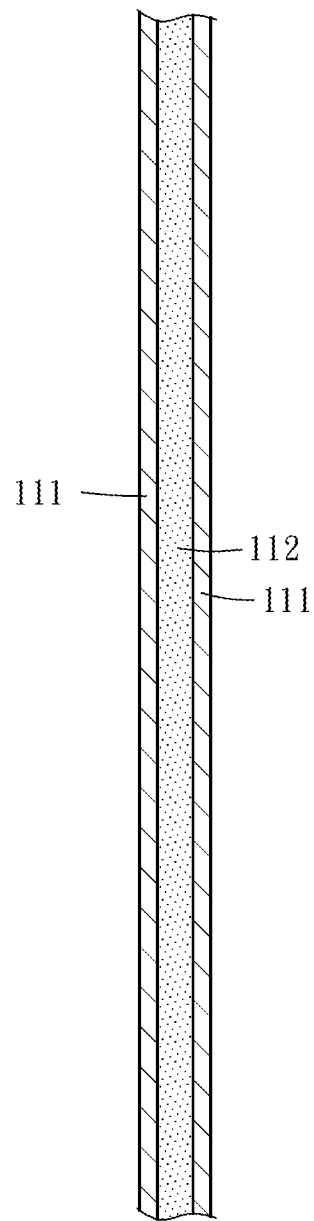
FIG. 5 is a schematic sectional view of a part of the disc.

The two discs 10 are circular, and a through hole 11 is provided in the center. Each disc 10 composes two composite material layers 111 and a foam material 112 bonded between the two composite material layers 111, as shown in FIG. 5, where the composite material layers 111 can be carbon fiber or glass fiber.

The wheel frame 20 is arranged between the two discs 10 in a concentric manner. The outer diameter of the wheel frame 20 is less than or equal to the diameter of the two discs 10.

Figure 1:
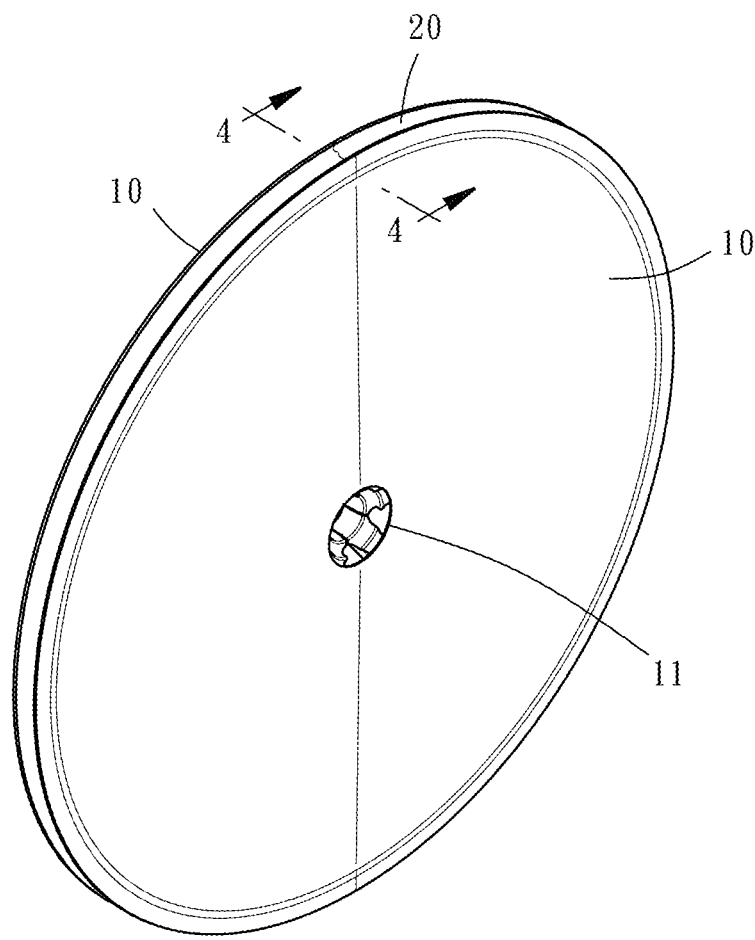
FIG. 1 is an oblique top elevational view of a bicycle disc wheel in accordance with the present invention.
Figure 2:
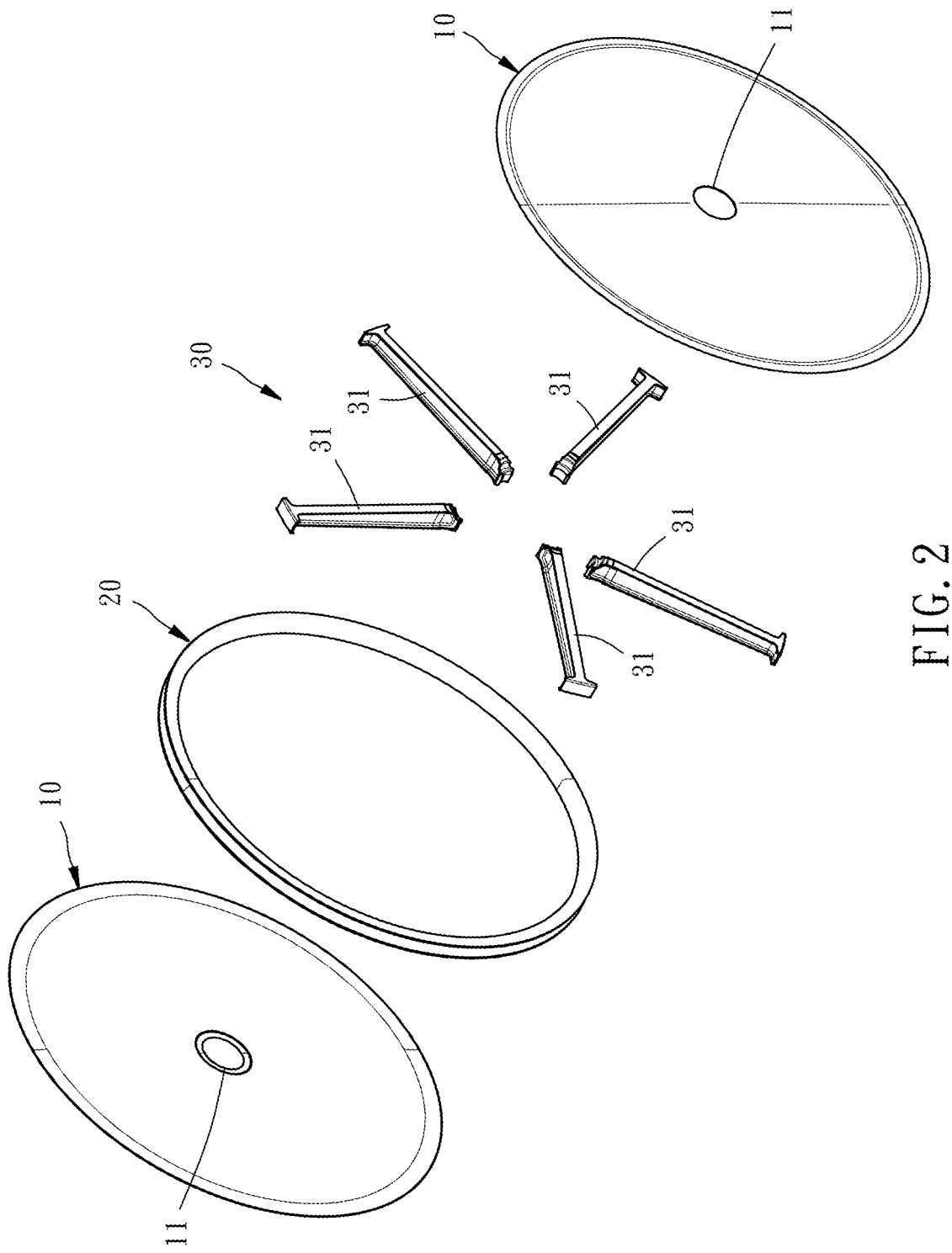
FIG. 2 is an exploded view of the bicycle disc wheel in accordance with the present invention.
Figure 3:
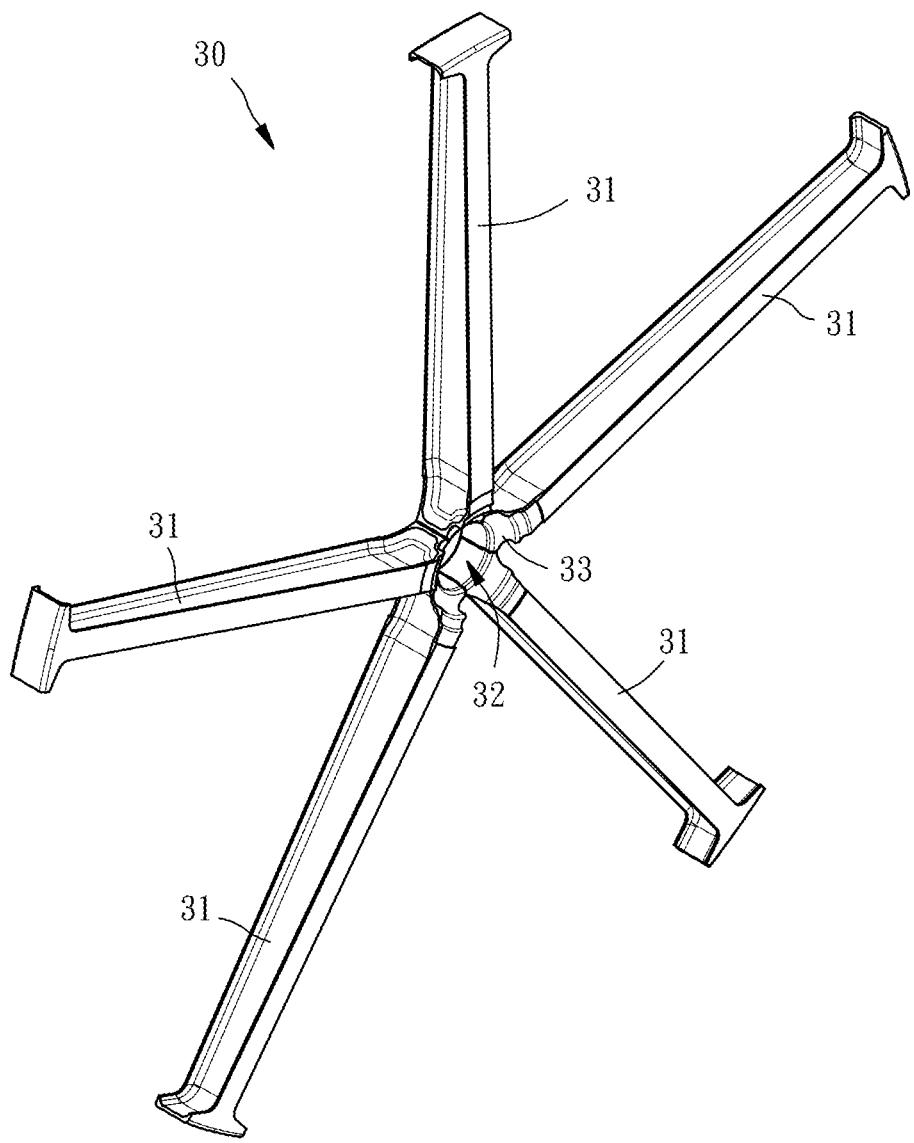
FIG. 3 is an elevational view of the spoke frame.
Figure 4:
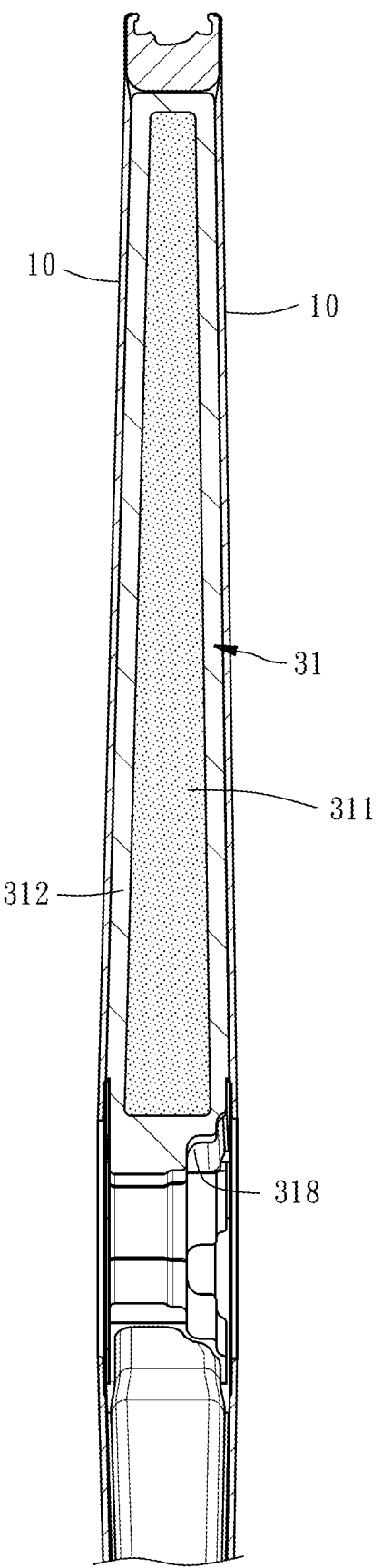
FIG. 4 is a sectional view taken along line 4-4 of FIG. 1.

The spoke frame 30 is composed of a plurality of I-shaped ribs 31, as shown in FIG. 2 and FIG. 3. Each I-shaped rib 31 is disposed within the wheel frame 20 and sandwiched between the two discs 10. Because the structure of each I-shaped rib 31 is the same, the following description is based on an I-shaped rib.

The I-shaped rib 31 has a long shape, and is composed of a foam material 311 and a composite material 312 that is cladded on the foam material 311. The composite material 312 can be carbon fiber or glass fiber. When the I-shaped rib is viewed from its cross section, the width of the upper and lower sides is wide, and the width of the middle section is narrow, showing an I-shaped configuration. Each I-shaped rib 31 has the relatively wider upper and lower sides thereof respectively bonded to the two discs 10 to increase the support for the discs 10.

Figure 6:
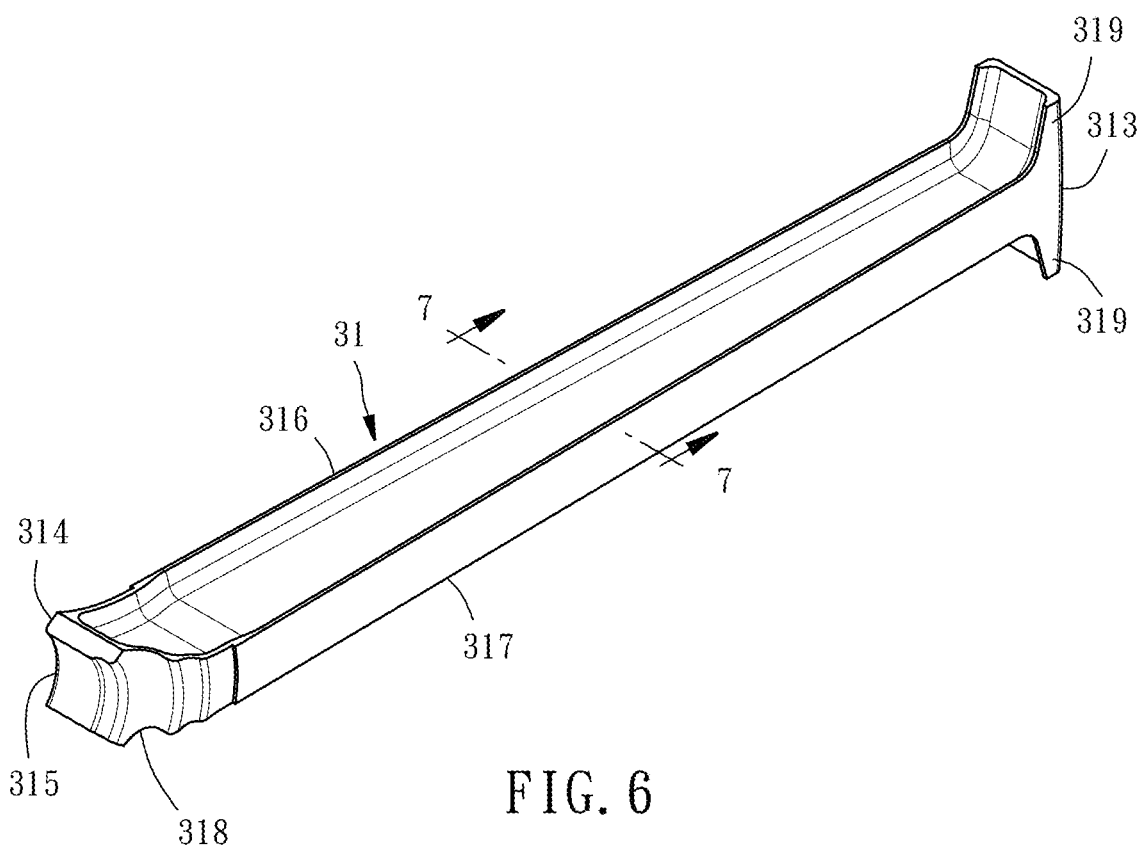
FIG. 6 is an elevational view of the I-shaped rib.
Figure 7:
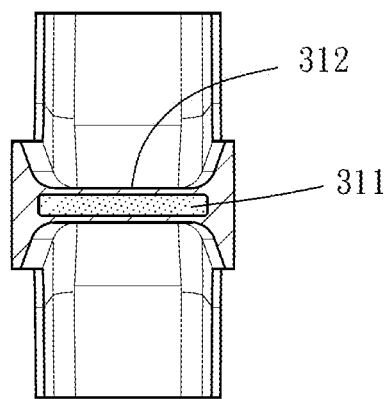
FIG. 7 is a sectional view taken along line 7-7 of FIG. 6.

As shown in FIG. 6 and FIG. 7, the I-shaped rib 31 has an outer end 313 and an inner end 314 in the longitudinal direction. The outer end 313 is fixedly fastened to the wheel frame 20, and the I-shaped rib 31 is provided with an outer expansion portion 319 on both sides of the outer end 313 for connection with the wheel frame 20, so that the outer diameter of the outer end 313 is increased to increase support. The outer end 313 is curved to better connect the arc of the wheel frame 20. The inner end 314 of each of the I-shaped ribs 31 is provided with an arc-shaped recess 315, so that the I-shaped ribs 31 can abut against one another and surrounded by the arc-shaped recesses 315 to form an inner ring 32 for mounting the hub (not shown). As shown in FIG. 6, this is an elevational view of the I-shaped rib in the present invention. Viewed from the direction of the diagram, the I-shaped rib 31 has a left edge 316 and a right edge 317, and the left edge 316 and the right edge 317 define a width therebetween. The I-shaped rib 31 is provided with a concave portion 318 on the right edge 317 of its inner end 314. The bottom surface of the concave portion 318 forms a gap with the topmost surface of the right edge 317 of the I-shaped rib, and the concave portion 318 is connected with the arc-shaped recess 315. Thereby, the concave portions 318 of the I-shaped ribs 31 can form a concave ring-shaped bearing portion 33 at the periphery of the inner ring 32 formed by the I-shaped ribs 31. Because of the setting of the concave ring-shaped bearing portion 33, the convex ring of the hub body (generally referred to as flange with spoke holes) can fall on the concave ring-shaped bearing portion when the hub is set, so that the overall shape of the disc wheel is flatter.

In the present invention, the spoke frame 30 is not limited to a combination of a plurality of I-shaped ribs 31, and the spoke frame 30 can also be an integrated structure. Based on the structure of the present invention, the disc wheel is connected by the I-shaped ribs 31 between the wheel frame 20 and the inner ring 32, so that the structural strength of the entire disc wheel is better than the traditional structure supported by only two discs 10, increasing the support of the disc wheel and reducing the possibility of distortion. Because the structure strength of the disc wheel of the present invention is better than the traditional disc wheel structure, the disc wheel of the present invention can convey the riding force of the rider be more clearly and directly. With this, the structural strength of the disc wheel can be improved without adding too much weight.

What is claimed is:

1. A bicycle disc wheel, comprising:

two discs being circular, each of said discs having a through hole provided in the center; a wheel frame arranged between said two discs in a concentric manner; and a spoke frame composed of a plurality of I-shaped ribs and sandwiched between said two discs, each of said I-shaped ribs being composed of a foam material and a composite material cladded on said foam material, each said I-shaped rib having opposite upper and lower sides connected by a middle section, wherein the upper and lower sides are relatively wider than the middle section when each said I-shaped rib is viewed from a cross section thereof, said relatively wider opposite upper and lower sides of each said I-shaped rib being respectively attached to a respective inner side of said two discs, each said I-shaped rib having an outer end and an opposing inner end when each said I-shaped rib is viewed in the longitudinal direction thereof, said outer end of each said I-shaped rib being affixed to said wheel frame, each said I-shaped rib being provided with an outer expansion portion on both sides of said outer end for connection with said wheel frame, so that the outer diameter of said outer end of each said I-shaped rib is increased and curved to connect the arc of said wheel frame.

2. The bicycle disc wheel as claimed in claim 1, wherein each of said two discs composes two composite material layers and a foam material bonded between said two composite material layers.

3. The bicycle disc wheel as claimed in claim 2, wherein said inner end of each of said I-shaped ribs is provided with an arc-shaped recess, so that the I-shaped ribs abut against one another and surrounded by the said arc-shaped recesses thereof to form an inner ring.

4. The bicycle disc wheel as claimed in claim 3, wherein each said I-shaped rib has an upper edge and a lower edge with a height defined between said upper edge and said lower edge; each said I-shaped rib is provided with a concave portion on the said inner end thereof, said concave portion having a bottom surface thereof forming a gap with the topmost surface of the said upper edge of the associating said I-shaped rib, and said concave portion being connected with the said arc-shaped recess at the said inner end of the associating said I-shaped rib.

5. The bicycle disc wheel as claimed in claim 2, wherein said composite material layers of each of said two discs are selectively carbon fiber or glass fiber.

6. The bicycle disc wheel as claimed in claim 1, wherein said inner end of each of said I-shaped ribs is provided with an arc-shaped recess, so that said I-shaped ribs abut against one another and surrounded by the said arc-shaped recesses thereof to form an inner ring.

7. The bicycle disc wheel as claimed in claim 6, wherein each said I-shaped rib has an upper edge and a lower edge with a height defined between said upper edge and said lower edge; each said I-shaped rib is provided with a concave portion on the said inner end thereof, said concave portion having a bottom surface thereof forming a gap with the topmost surface of the said upper edge of the associating said I-shaped rib, and said concave portion being connected with the said arc-shaped recess at the said inner end of the associating said I-shaped rib.

8. The bicycle disc wheel as claimed in claim 1, wherein said spoke frame is an integrated structure.

\* \* \* \* \*